(12) United States Patent
Moberg et al.

(10) Patent No.: US 9,408,099 B2
(45) Date of Patent: Aug. 2, 2016

(54) METHOD OF TRANSMITTING CQI REPORTS

(75) Inventors: Peter Moberg, Stockholm (SE); Erik Eriksson, Linkoping (SE); Kristina Jersenius, Linkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 12/934,742

(22) PCT Filed: Apr. 28, 2008

(86) PCT No.: PCT/SE2008/050484
§ 371 (c)(1),
(2), (4) Date: Sep. 27, 2010

(87) PCT Pub. No.: WO2009/123520
PCT Pub. Date: Oct. 8, 2009

(65) Prior Publication Data
US 2011/0021230 A1   Jan. 27, 2011

Related U.S. Application Data

(60) Provisional application No. 61/040,834, filed on Mar. 31, 2008.

(51) Int. Cl.
H04B 15/00 (2006.01)
H04W 24/10 (2009.01)
H04L 1/00 (2006.01)

(52) U.S. Cl.
CPC ............. *H04W 24/10* (2013.01); *H04L 1/0027* (2013.01)

(58) Field of Classification Search
CPC ... H04L 1/0026; H04L 1/1671; H04L 5/0057; H04L 5/001; H04L 1/0027; H04L 5/0055; H04L 1/0073
USPC ......... 455/501, 509, 500, 517, 508, 511, 450, 455/67.11, 515, 550.1, 423–425, 455/414.1–414.4, 422.1, 403, 426.1, 426.2, 455/445; 370/328, 329, 343, 338, 330, 340, 370/341, 345
See application file for complete search history.

(56) References Cited

U.S. PATENT DOCUMENTS

| | | | |
|---|---|---|---|
| 7,457,588 B2 * | 11/2008 | Love et al. | 455/67.11 |
| 2006/0116080 A1 * | 6/2006 | Eom | 455/62 |
| 2008/0057969 A1 * | 3/2008 | Agami et al. | 455/450 |
| 2009/0201861 A1 * | 8/2009 | Kotecha | 370/329 |

FOREIGN PATENT DOCUMENTS

EP   1309121 A1   5/2003

OTHER PUBLICATIONS

3rd Generation Partnership Project. 3GPP TS 36.213, V8.2.0 (Mar. 2008). 3rd Generation Partnership Project; Technical Specification Group Radio Access Network; Evolved Universal Terrestrial Radio Access (E-UTRA); Physical layer procedures (Release 8). Mar. 2008.

* cited by examiner

*Primary Examiner* — Keith Ferguson
(74) *Attorney, Agent, or Firm* — Coats & Bennett, P.L.L.C.

(57) ABSTRACT

In a cellular radio system a UE transmits CQI reports on a periodic basis and also transmits CQI reports upon a request from the radio base station. The UE is further adapted to cancel transmission of a periodic CQI report upon reception of a request for a requested CQI report.

12 Claims, 3 Drawing Sheets

METHOD OF TRANSMITTING CQI REPORTS

TECHNICAL FIELD

The present invention relates to a method, system and a device for transmitting Channel Quality Indicators (CQI) reports.

BACKGROUND

Cellular communication networks constantly evolve towards higher data rates, together with improved capacity and coverage. In the 3rd Generation Partnership Project (3GPP) standardization body technologies like Global system for Mobile Communication (GSM), High Speed Packet Access (HSPA) and Long Term Evolution (LTE) have been and are currently developed.

LTE is the latest technology to be standardised. It relies on an access technology based on OFDM (Orthogonal Frequency Division Multiplexing) for the downlink (DL) and Single Carrier FDMA (SC-FDMA) for the uplink (UL), see 3GPP TS 36.201, Evolved Universal Terrestrial Radio Access (E-UTRA); Long Term Evolution (LTE) physical layer; General description, version 800.

The resource allocation to user equipments (UEs), both in the downlink channel and the uplink channel, is performed adaptively employing fast scheduling and taking into account the instantaneous traffic pattern and radio propagation characteristics of each UE. Assignment of resources for the downlink and for the uplink is performed in a scheduler located in the eNodeB of the LTE system.

To enable an efficient scheduling based on instantaneous radio characteristics, the scheduler needs information about current channel conditions. In LTE the downlink scheduler uses Channel Quality Indicators (CQI) reports that are transmitted on the uplink channel from the UE to the scheduler and contains information about the downlink channel characteristics for this particular user in order to make proper allocation decisions.

In an LTE system, the CQIs can be of various types, wideband and frequency selective. The report-formats for an UE are configured by the Radio Resource Control (RRC) layer. A full description of all report-formats can be found in 3GPP TS 36.213 Evolved Universal Terrestrial Radio Access (E-UTRA); Physical layer procedures.

CQI reports contain information obtained by measuring the signal strength on downlink channel reference symbols and interference estimations. A CQI value indicates a transport format (coding and modulation) for parts of or the entire downlink channel that gives an acceptable error rate.

In the current LTE standard, CQI reports can be transmitted on two alternative channels. One is the Physical Uplink Control Channel (PUCCH), where a UE can be assigned a periodic resource. The assignment and revocation of these resources are configured by the RRC layer. Also, CQIs can be transmitted on the Physical Uplink Shared Channel (PUSCH). The CQIs transmitted on the Physical Uplink Shared Channel are event or timer based transmissions that are scheduled and transmitted time multiplexed together with regular uplink data. To indicate if the UE is to transmit a CQI report on the PUSCH, the uplink channel grant given by the scheduler sets a dedicated "CQI indicator" bit to 1, otherwise it is 0, see 3GPP TS 36.212 Evolved Universal Terrestrial Radio Access (E-UTRA); Multiplexing and channel coding and 3GPP TS 36.213 Evolved Universal Terrestrial Radio Access (E-UTRA); Physical layer procedures.

If a PUSCH transmission coincides with a PUCCH CQI transmission the CQI will be transmitted on the PUSCH. In this case the CQI format configured for the PUCCH will be used unless the "CQI indicator" bit is set. If the "CQI indicator" bit is set it will override and the PUSCH CQI format is used.

The PUCCH in LTE is used not only for CQI reports but also for scheduling requests (SRs) and HARQ ACK/NACK feedback for downlink data. The PUCCH resource is located on resource blocks (RBs) along the bandwidth edges of the UL frequency band and frequency hopping is used to gain frequency diversity.

The number of resource blocks allocated for PUCCH can be configured to basically any appropriate value. On the PUCCH resource blocks, transmissions are multiplexed using a code division. The basic resource per pair of resource blocks is the number of orthogonal codes available for transmission within a cell.

On a general level, the LTE standard supports 18 orthogonal resources per pair of resource blocks. Further, an ACK/NACK and scheduling requests transmissions occupies one of these codes enabling 18 simultaneous scheduling requests or ACK/NACK transmissions while a CQI transmission requires three times the resource enabling at most 6 CQI transmissions per pair of resource blocks. These transmissions may also be transmitted together on the channel, in which case a CQI transmission can be traded against 3 scheduling requests or ACK/NACKs.

Another aspect of the CQI reporting is the support of periodic PUSCH allocation by means of a persistently scheduled resource. With a persistent scheduling the UE will be allocated a specified resource with a certain periodicity without the need for a specific grant for every allocation. Also in this persistent grant the CQI indicator can be set, giving a periodic CQI reporting on PUSCH.

As described above the CQI reports can be transmitted on PUCCH as well as PUSCH. The PUCCH resource is periodic and assigned by the radio resource control. It is revoked by radio resource control or if the UE falls out of synchronization, which is timer controlled at the UE or at cell reselection, e.g. at handover.

To enable efficient scheduling decisions within the LTE standard, the CQI reports must be up to date, implying that they must be transmitted rather frequently to be effective. A UE with a periodic CQI resource allocated on the PUCCH will use this on every occasion. The exception is if it is simultaneously, i.e. within the same Transmission Time Interval TTI, scheduled for a PUSCH transmission, in which case the PUCCH resource will be left unused.

One problem with the existing method of transmitting CQI reports is that the PUCCH has a low load requirement and therefore is an expensive resource in terms of radio resources. The fact that an allocated periodic CQI resource on the PUCCH will be used by UEs not involved in concurrent uplink transmission can imply that substantially less than the six maximum CQI users should be assigned per TTI and pair of resource blocks, in order to secure robustness on the interference sensitive PUCCH.

To frequently revoke and reallocate the PUCCH resources by means of radio resource control is not feasible on a fast time scale and the radio resource control messages are high priority signaling messages, which are expensive from a radio resource perspective. Other possibilities to solve the allocation problem using support from the current standard are to assign the CQI resources on the PUCCH very infrequently, or alternatively allocate more resource blocks for PUCCH usage. Both of these methods are inefficient and will degrade system performance.

Hence, there exist a need for a method and a system that is able to provide a more efficient use of resources, such as PUCCH resources in a cellular telecommunication system.

SUMMARY

It is an object of the present invention to overcome or at least reduce some of the problems associated with utilization of resources, such as PUCCH resources in existing systems.

This object and others are obtained by the method, user equipment and node as set out in the appended claims. Thus, in a cellular radio system a UE transmits CQI reports on a periodic basis and also transmits CQI reports upon a request from the radio base station. The UE is further adapted to cancel transmission of a periodic CQI report upon reception of a request for a requested CQI report.

For example in accordance with one embodiment in case a CQI report is sent on PUSCH, in response to a grant with a CQI indicator bit set to 1, an allocated periodic CQI report on PUCCH is cancelled. In particular the periodic reports can be cancelled during a configurable time T. This gives the means to schedule users to lower the PUCCH load.

The window time T can be configured by the eNodeB in some way, e.g. via an RRC or MAC control message. A more specific solution is to configure T in the RRC allocation message used to set up the PUCCH resource. An alternative is to let the time T be fixed or depend on some other parameter.

In this way, resources can be utilized more efficiently. In particular the load on the PUCCH can be controlled and lowered if necessary, enabling a more efficient utilization of the orthogonal PUCCH resources.

BRIEF DESCRIPTION OF THE DRAWINGS

The present invention will now be described in more detail by way of non-limiting examples and with reference to the accompanying drawings, in which.

DETAILED DESCRIPTION

Figure 1:
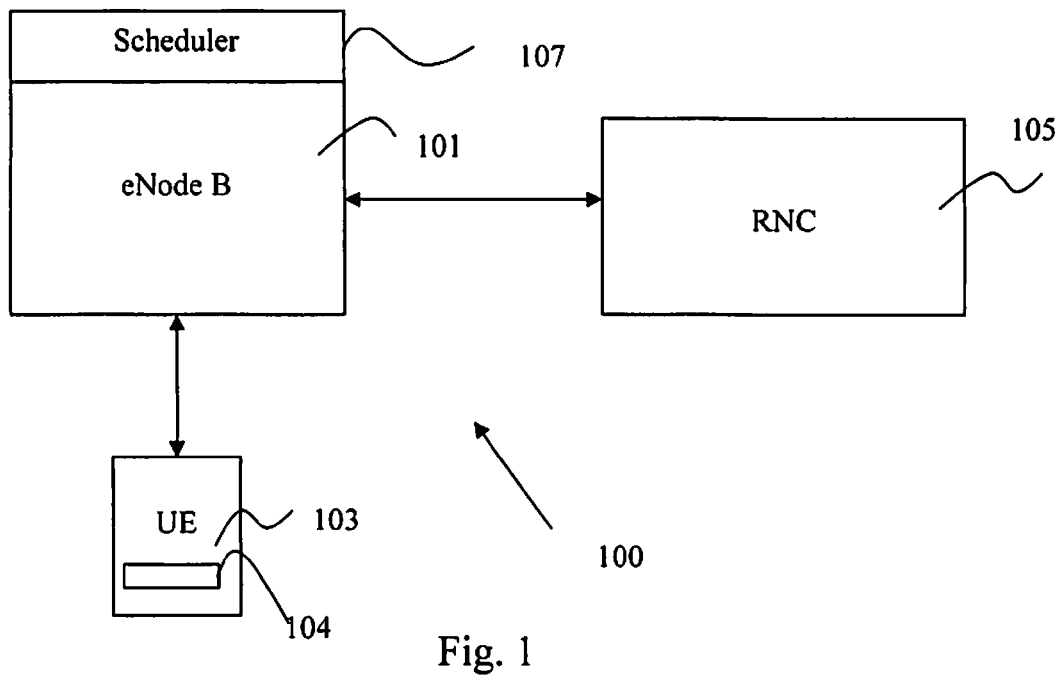
FIG. 1 is a view illustrating selected parts of a cellular radio system.

In FIG. 1 a view illustrating selected parts of a cellular radio network 100. In particular the network 100 can be an LTE radio network and the terms used for different parts of the network corresponds to those of an LTE network but the invention is not limited to an LTE network. The network 100 comprises a number of radio base stations, in this example evolved Node Bs (eNode B) 101, enabling radio access via an air interface for User Equipments (UE) 103 located within a geographical area covered by the network 100. The eNodeBs 101 are in turn connected to a Radio Network Controller RNC 105.

Each eNode B of the network 100 comprises a scheduler 107 for assigning resources for downlink and for the uplink transmissions.

The scheduler 107 uses Channel Quality Indicators (CQI) reports that are transmitted on the uplink channel from the UE 103 to the scheduler 107 when scheduling down link transmissions. The CQI reports contain information about the downlink channel characteristics for a particular UE 103 in order to make proper allocation decisions. Further the UE 103 comprises a module 104 for generating CQI reports to be transmitted to the radio base station 101 in a predetermined manner as described in more detail below.

Figure 2:
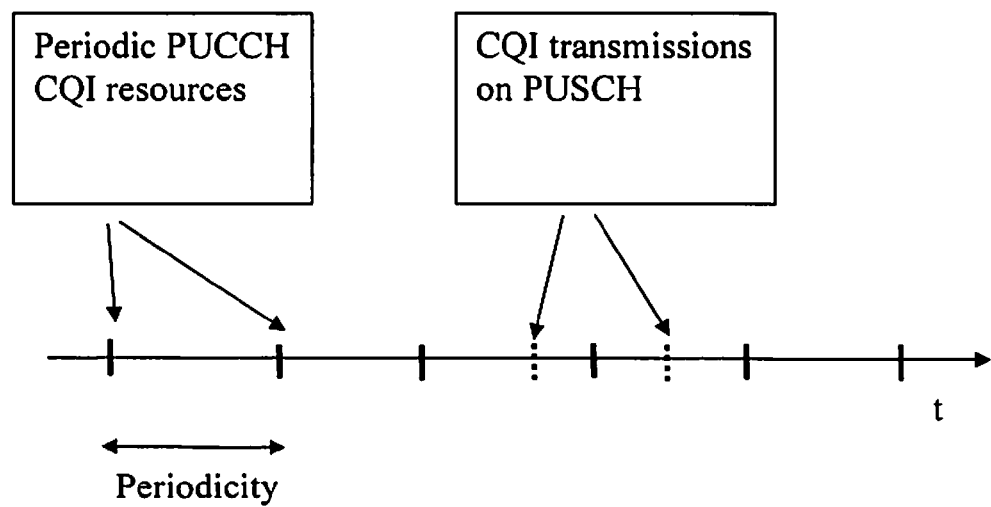
FIG. 2 illustrates CQI report transmissions.

In a conventional LTE system the UE 103 has an allocated PUCCH resource dedicated for CQI transmission. FIG. 2 shows a high level view of the interaction between the CQI reporting on PUCCH and PUSCH resources as present in existing solutions. They are basically independent, except in the case of a PUSCH allocation simultaneously as the PUCCH resource.

The periodic PUCCH resource is allocated from the RRC layer at one particular moment, i.e. this resource will be available until revoked. If the eNodeB scheduler 107 decides that more detailed or more frequent reports are necessary the UE 103 can be scheduled resources for transmission of CQI on the PUSCH by setting a specific bit in the uplink grant to 1. One reason for using the shared data channel is that the PUSCH is a cheaper resource; especially if more detailed (i.e. a larger number of bits) CQI reports are requested.

However, if the transmission scheme as depicted in FIG. 2 is employed, the PUCCH allocations will be used for CQI reporting even if very detailed CQI reports are transmitted on the PUSCH.

Figure 3:
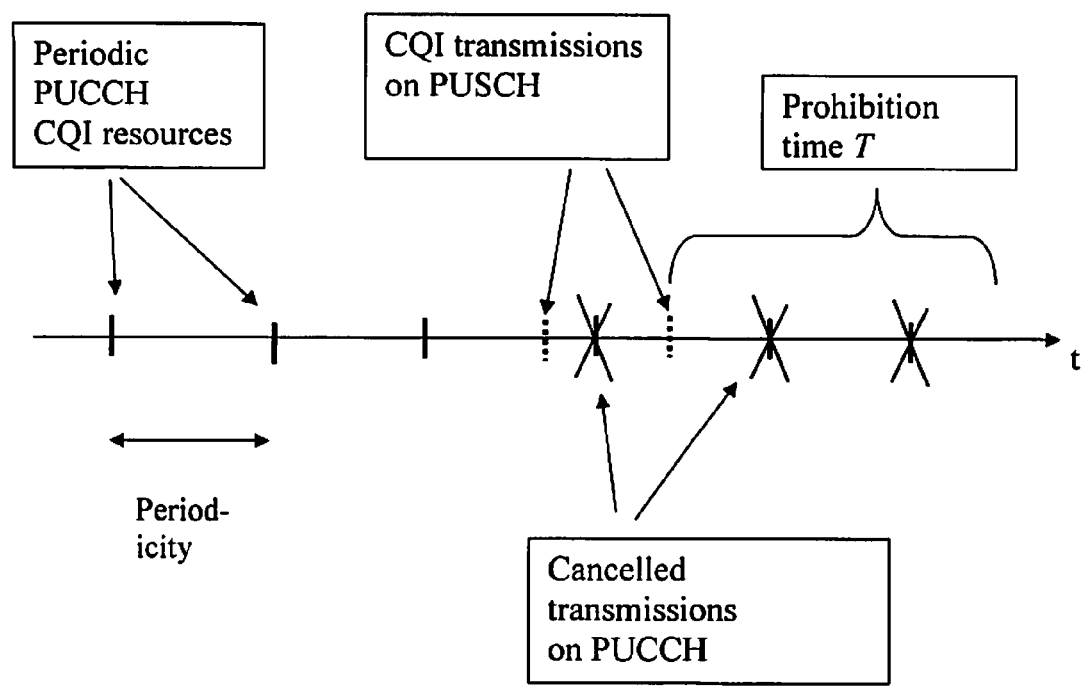
FIG. 3 illustrates CQI report transmission in accordance with one embodiment of the present invention.

In order to save radio resources a different report procedure can be employed in accordance with the present invention. FIG. 3 illustrates a reporting procedure in accordance with one embodiment of the present invention. In accordance with the reporting procedure depicted in FIG. 3 a CQI transmission on the PUSCH or a reception of the bit indicator in the grant will imply that the potential PUCCH transmissions within a window time of a predetermined time T are cancelled.

By allowing the window time T to be configurable, the system can trade between detailed and less detailed CQI reports, as well as between PUCCH load and PUSCH load. In comparison with existing reporting procedure the PUCCH load can be decreased and an overall PUCCH performance improvement can be obtained.

Furthermore, the CQI reporting on the PUSCH does not rely completely on transmissions of uplink data, since the scheduler can call for a stand alone CQI report.

In accordance with one embodiment of the present invention is the special case that the time T is always zero. In this embodiment the eNodeB 101 can lower the load on the PUCCH by assigning a grant valid for the sub frame when the UE 103 is supposed to transmit CQI on PUCCH. The UE 103 will then transmit the CQI on PUSCH instead of PUCCH and the load on PUCCH is decreased. This does not require an existence of a fixed or configurable parameter T and is already supported in the agreed LTE standard.

A special case to consider in this context is if a PUSCH allocation without the CQI indicator set to 1 would coincide with an earlier cancelled PUCCH CQI resource. In this case there are different options. In accordance with one embodiment the CQI transmission is cancelled also on PUSCH. In this embodiment the eNodeB 101 can select to get no CQI report by not setting the CQI indicator in grants valid for the sub-frames in which PUCCH CQI are cancelled.

In another embodiment the CQI transmission is not cancelled on PUSCH. In this embodiment the eNodeB can select to get a PUCCH format CQI report on PUSCH by not setting the CQI indicator in grants valid for the sub-frames in which PUCCH CQI are cancelled. If the CQI indicator is set to 1, the CQI report will be transmitted with the PUSCH format on PUSCH.

In accordance with one embodiment of the present invention the prohibit time T is configured in relation to the periodicity of a persistently scheduled CQI resource on PUSCH. By selecting the time T to correspond to the periodicity of a persistently scheduled CQI, the PUCCH CQI reporting can be completely replaced by PUSCH reporting.

Another possibility is to revoke the PUCCH resource if a persistent PUSCH is configured. This can then happen automatically if a persistent PUSCH allocation, with the CQI indicator bit set to 1, together with the current configuration of T cancels all allocated PUCCH CQI transmissions. This gives the possibility to assign that PUCCH resource to another UE, hence further limiting the size requirement on the PUCCH.

Figure 4:
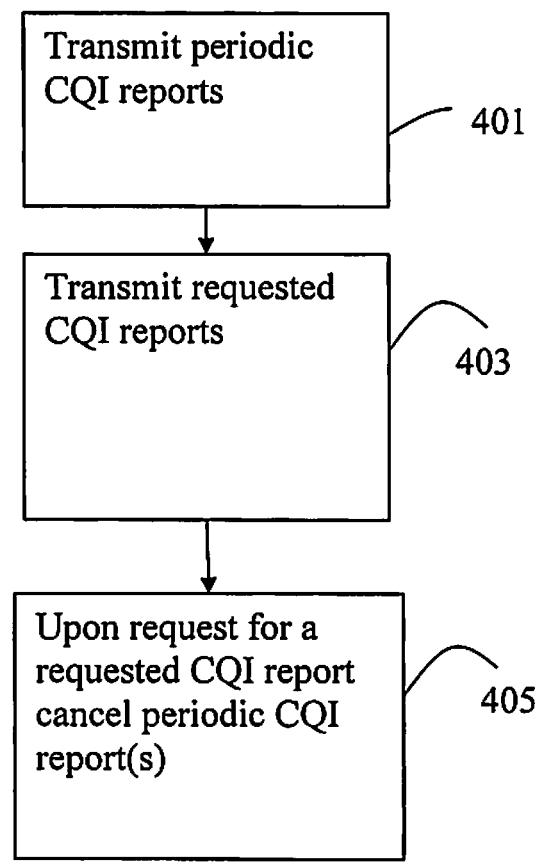
FIG. 4 is a flow chart illustrating different steps performed when transmitting CQI reports.

In FIG. 4, a flow chart illustrating steps performed when scheduling transmission of CQI reports is shown. First in a step 401a UE 103 is set to periodically report a CQI. For example the report may be scheduled to be reported on the PUCCH channel of an LTE system. Next, in a step 403, the UE is set to transmit a CQI report in response to a request from the radio system 100. In particular the request can be reception of a bit indicator in the grant. The requested CQI report can for example be transmitted on the PUSCH channel in an LTE system. In case a request for a requested CQI report is received the UE is adapted, in a step 405, to cancel transmission of a number of upcoming periodic CQI reports. In particular the next periodic CQI report is cancelled or a number of periodic CQI reports for a time period T are cancelled as described above.

Using the CQI report procedure as described herein, resources such as PUCCH CQI resources can be utilized in a more efficient fashion. In case the CQI reports are transmitted on the PUCCH, the consequence is that the amount of PUCCH resources can be reduced resulting in less overhead and better performance. In other systems corresponding improved performance will be gained.

In a system transmitting CQI reports over PUCCH, CQI reports can potentially be transmitted more frequently leading to better scheduling decisions and in the end improved system performance with equal PUCCH overhead.

Also the PUCCH load is preferably kept low since it typically suffers from interference levels beyond 20% (which translates to ~3.6 transmissions per TTI). If CQI report allocations are reserved and all are expected to be used, not more than 3 per resource block pair can be allocated, while still supporting a good performance. However, using the report procedure as described herein, the utilization of the allocated CQI reporting resource can be reduced, leading to a possibility to allocate up to 6 CQI resources per resource block pair without the risk of performance degradation.

The invention claimed is:

1. A method of transmitting Channel Quality Indicator (CQI) reports in a cellular radio system, the method being implemented by a User Equipment (UE) and comprising:
   transmitting CQI reports on a first uplink channel on a periodic basis;
   transmitting CQI reports on a second uplink channel, different from the first uplink channel, responsive to a request from a radio base station; and
   cancelling transmission of a periodic CQI report on the first channel responsive to reception in the UE of a request from the radio base station for a requested CQI report to be transmitted on the second uplink channel.

2. The method of claim 1, wherein the first uplink channel is a Physical Uplink Control channel (PUCCH) and the second uplink channel is a Physical Uplink Shared Channel (PUSCH).

3. The method of claim 1, wherein the periodic reports are cancelled during a predetermined time period.

4. The method of claim 3, wherein the predetermined time period is configurable.

5. The method of claim 4, wherein the predetermined time period is configured by the radio base station via a Radio Resource Control message or a Media Access Control message.

6. A User Equipment (UE) comprising a Channel Quality Indicator (CQI) reporting module configured to generate CQI reports, the UE being configured to transmit the CQI reports to a radio base station in a cellular radio system by being configured to:
   transmit CQI reports on a first uplink channel on a periodic basis;
   transmit CQI reports on a second uplink channel, different from the first uplink channel, responsive to a request from the radio base station; and
   cancel transmission of a periodic CQI report on the first uplink channel responsive to reception of a request from the radio base station for a requested CQI report to be transmitted on the second uplink channel.

7. The UE of claim 6, wherein the first uplink channel is a Physical Uplink Control channel (PUCCH) and the second uplink channel is a Physical Uplink Shared Channel (PUSCH).

8. The UE of claim 6, wherein the UE is configured to cancel transmission of periodic reports during a predetermined time period.

9. The UE of claim 8, wherein the UE is adapted such that the predetermined time period is configurable.

10. The UE of claim 9, wherein the UE is adapted to receive an indication of the predetermined time period via a Radio Resource Control message or a Media Access Control message from the base station.

11. A radio base station configured to:
   receive Channel Quality Indicator (CQI) reports in a cellular radio system from a User Equipment (UE) on a periodic basis and also in response to a request transmitted from the radio base station to the UE, wherein the periodic CQI reports are transmitted on a first uplink channel and the requested CQI reports are transmitted on a second uplink channel that is different from the first uplink channel; and
   transmit an indication of a configurable time period to the UE, wherein the configurable time period indicates to the UE the time during which periodic reports are to be cancelled by the UE after reception in the UE of a request from the radio base station for a requested CQI report on the second uplink channel.

12. The radio base station of claim 11, wherein the radio base station is also configured to:
   transmit an indication of the configurable time period in a Radio Resource Control message or a Media Access Control message.

* * * * *